United States Patent [19]

Gagliani

[11] Patent Number: 5,044,759

[45] Date of Patent: Sep. 3, 1991

[54] MIXING PROCESS AND SCREW EXTRUDERS FOR CARRYING OUT THE SAME

[76] Inventor: Giuseppe Gagliani, Via Ugo La Malfa n, 10126, Palermo, Italy

[21] Appl. No.: 315,241

[22] Filed: Feb. 21, 1989

Related U.S. Application Data

[63] Continuation-in-part of Ser. No. 52,731, May 20, 1987.

[51] Int. Cl.$^5$ .................................................. B01F 7/08
[52] U.S. Cl. ......................................... 366/88; 366/90; 366/321; 366/324
[58] Field of Search ..................... 366/81, 88, 90, 319, 366/322, 323, 321, 324, 327, 328, 318

[56] References Cited

U.S. PATENT DOCUMENTS

| | | | |
|---|---|---|---|
| 3,427,003 | 2/1969 | Schneider et al. | 366/321 |
| 3,764,118 | 10/1973 | Matsuoka | 366/321 X |
| 4,103,354 | 7/1978 | Gorbatuv et al. | 366/88 |
| 4,118,163 | 10/1978 | Lee | 366/88 X |
| 4,363,671 | 12/1982 | Rugg et al. | 366/90 X |
| 4,392,967 | 7/1983 | Alexander | 366/90 X |
| 4,416,606 | 11/1983 | Sugano et al. | 366/321 X |
| 4,600,311 | 7/1986 | Maurrier | 366/322 X |

Primary Examiner—Frankie L. Stinson
Attorney, Agent, or Firm—Michael J. Striker

[57] ABSTRACT

Process for mixing products uses an extruder having one or more screws, rotating in a cylinder, to determine forward movement of the material. A backward flow of material is generated by means of a counterthreading whose lead is opposite to that of the extruder screw. The backward flow on meeting the forward flow gives rise to increasingly thorough mixing while the material moves forward. The forward movement of the mixed material is ensured by providing the counter threading with a helical channel whose lead is the same as that of the extruder screw, or with channels or holes of varying sizes and position.

4 Claims, 5 Drawing Sheets

MIXING PROCESS AND SCREW EXTRUDERS FOR CARRYING OUT THE SAME

CROSS-REFERENCE TO RELATED APPLICATION

This is a continuation-in-part of application Ser. No. 052,731, filed on May 20, 1987, now abandoned.

BACKGROUND OF THE INVENTION

Mixers designed for thoroughly mixing various components, are well-known tools. Mixing of this kind is required in processing plastics, and in the food-, chemical-, pharmaceutical- and other industries.

Three main mixing process are in use, especially in the manufacture of plastic materials:
- a discontinuous process in which the materials are first mixed and then placed in an extruder;
- a continuous process in which mixing is done in an extruder having two concordant screw movements; and
- a continuous process, patented by Buss, in which mixing is done in an extruder by a screw that rotates and translated in a chamber fitted with small teeth which assist mixing of the material pushed forward by the screw.

These systems are constructionally complex and their cost is therefore high.

The disadvantage of the process based on two screws having concordant movements is particularly the discontinuous speed in the zone where the two screws lie adjacent to each other causing much friction and high thermal gradients.

To avoid polymerization of certain materials the speed of screw rotation is kept low thus reducing output.

The process according to the present invention aims to eliminate the above drawbacks.

SUMMARY OF THE INVENTION

The invention provides a process for homogenizing, kneading, dispersing, coloring and mixing in general, products for the most varied uses, especially as concerns processing plastics, but also in the food-, paper-, chemical- and pharmaceutical industries and others.

According to this process, in an extruder having at least one screw rotating in a cylinder to move the material forward, a backward movement of material is generated by means of a thread cut in a direction opposite to that of the screw so that, when the backward moving material meets the forward moving material, the two oppositely directed streams of material are moved with increasing thoroughness as advancement of the material as a whole proceeds.

The counterthread is situated on the shank of the extruder screw downstream of its thread or between two lengths of this thread.

Alternatively, the counterthread is situated on the inner face of the cylinder in which the extruder screw rotates.

As the case may require, the cylinder within which the extruder screw rotates is held stationary or is made to rotate in a counterdirection, or in the same direction as the extruder screw.

Forward movement of the mixed materials, downstream of the thread cut contrary to that of the extruder screw, is ensured by a helical groove or channel whose direction is the same as that of the extruder screw thread, the channel crossing the helical groove or channel created by the thread in the opposite direction.

It follows that, at the various crossing points between the first mentioned helical channel and the channel created by the counterthread, the material flowing from the two channels, and therefore from preceding crossing points as well, meets in such a way that the mixing becomes increasingly thorough as the material advances.

In one embodiment of the process, the advancement of the mixed material is obtained by channels, holes or the like cutouts in the thread running counter to the extruder screw thread, or by channels cut in the area of the inner face of the cylinder opposite to the counterthread and made to run contrary to that of the extruder screw.

Downstream of the counterthread, a throttle bushing is mounted to reduce the space between the shank of the extruder screw and the cylinder, and to limit flow speed of the material. By varying the diameter of the bushing, the time the material remains in the mixing zone, the pressure exerted on the material and therefore the degree of mixing, can be varied at will.

Characteristics and purposes of the invention will be made still clearer by the following examples of specific embodiments illustrated in the drawings.

DETAILED DESCRIPTION OF THE PREFERRED EMBODIMENTS

Figure 1:
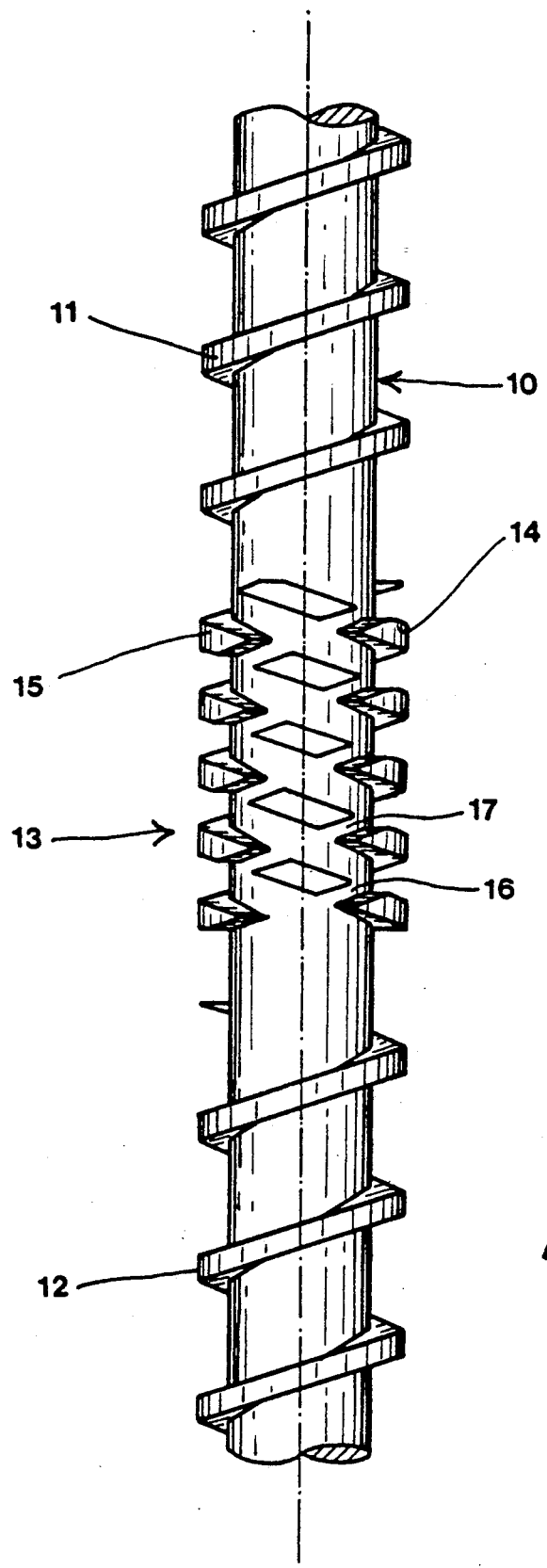
FIG. 1 is a perspective side view of an embodiment of the extruder screw of the invention, provided with a mixer.

The extruder screw 10 includes threaded sections 11 and 12 between which the mixer 13 of this invention is situated.

The mixer consists of two interleaved threads 14, 15 whose pitch is the same as that of the screw 10 and which intersect each other. The thread 14 is set in the same direction as threads 11 and 12 of the extruder screw while thread 15 is set in the opposite direction. There are free spaces 16, 17 between the two threads 14, 15.

Figure 2:
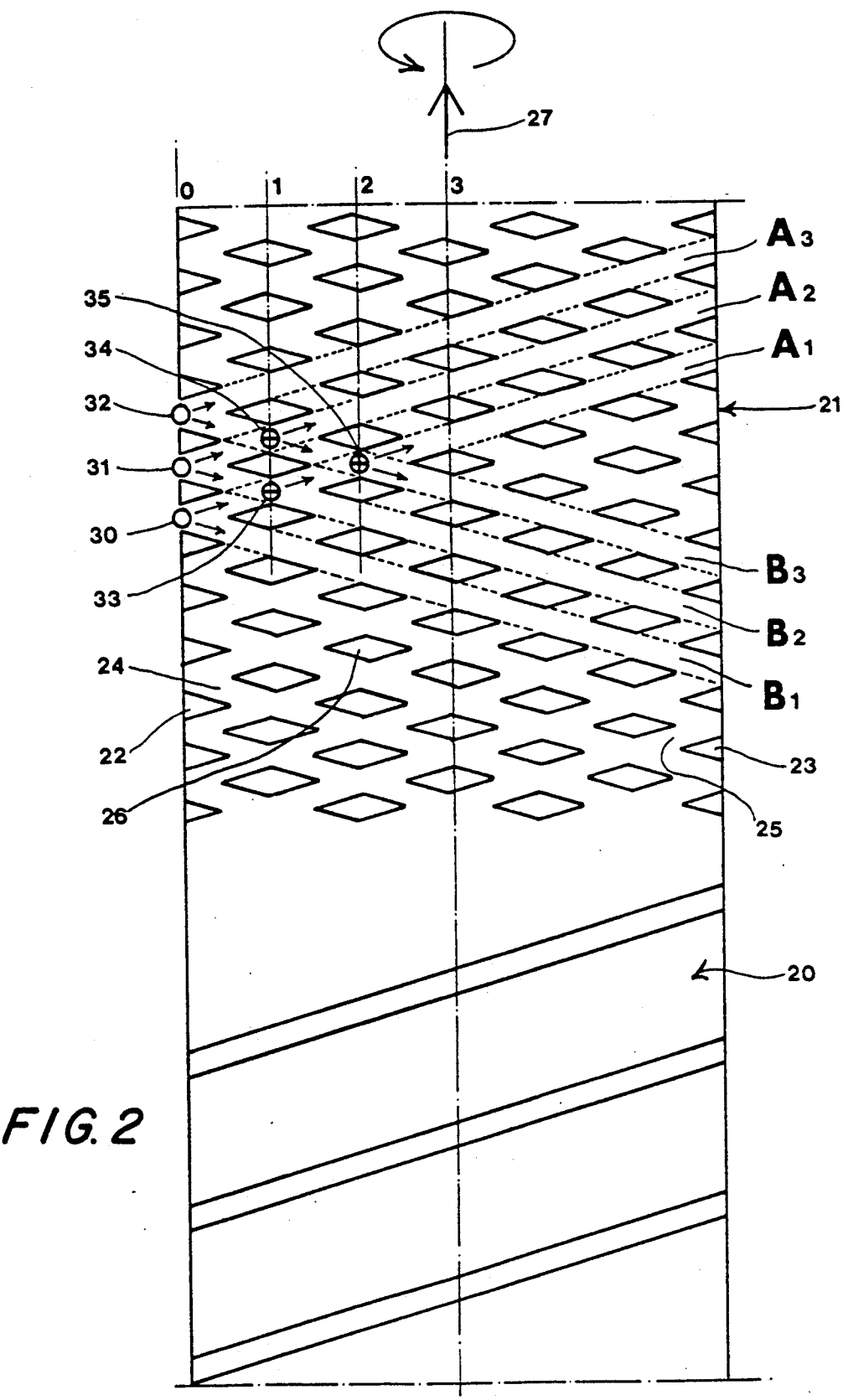
FIG. 2 is a diagrammatic side view of a portion of the screw extruder of the invention, shown on an enlarged scale.

Turning of the screw creates the phenomena more clearly seen in FIG. 2.

FIG. 2 shows in an enlarged view a part of an extruder screw 20 provided with the mixer 21 comprising multi-stub screw threads 22, 23 of the same pitch as threads of the screw 20.

The thread 22 is set in the same direction as that of screw 20 while thread 23 is set in the opposite direction.

The two threads 22, 23 intersect leaving free spaces 24, 25 between each other and creating at their meeting points rhomboid shaped-stubs 26.

It is presumed that the screw 20 turns anticlockwise and that the material is thrust in the direction shown by the arrow 27.

Threads 22 give rise to channels An (n=1, 2, 3 ...) which assist forward movement of the material as they are set in the same direction as the thread of the screw, while channels Bn (n=1, 2, 3 ...) impress backward movement on the material.

A particle of material placed on a crossing point between channels An and Bn is expressed by 14 symbols, dV, An, Bn.

Longitudinal alignments of crossing points are indicated by 0, 1, 2, 3.

The particle 31 placed on the crossing point of channels A2 and B2 on the first alignment 0 is therefore expressed as $dVA2 B2$.

Particles 30 and 32 are expressed similarly by $dVA1B1$ and $dVA3B3$ respectively.

Due to the effect of screw rotation, the particles 30, 31, 32 will divide into practically equal parts, respectively $$\frac{dVA2B2}{2}$$

On the second alignment 1 of the crossing points, the parts meet and mix together giving rise to other particles, namely:

$$33 = dVA1B2 = \frac{dVA2B2}{2} + \frac{dVA1B1}{2}$$

$$34 = dVA2B3 = \frac{dVA2B2}{2} + \frac{dVA3B3}{2}$$

On the third alignment 2 of the crossing points, further mixing will take place and again other particles be formed such as 35.

$$35 = dVA1B3 = \frac{dVA1B2}{2} + \frac{dVA2B3}{2}$$
$$= 2\frac{dVA2B2}{4} + \frac{dVA1B1}{4} + \frac{dVA3B3}{4}$$

and so forth.

This clearly shows that even at the second crossing on the third alignment, a particle 35 is obtained from a mixture of the fourth parts of the particles 33 (two parts), 34 and 35.

Mixing in the various alignments 0, 1, 2, 3 of the crossings occurs practically as a geometrical progression. If one imagines, at each crossing on alignment 0, particles of material each formed of individual components, at the crossings of alignment 1 there will be particles of material each mixed with two components, at the crossings of alignment 2 there will be mixtures of four components two of which come from one and the same crossing of alignment 0, at the crossings of alignments 3 there will be mixtures of eight components, and so on.

It follows that, while the screw turns, the material is mixed a great number of times with particles which have been already mixed.

The ratio between mixing and output can of course be varied by having a single-, a double-, or a multi-threading, by altering core diameter, pitch, dimensions in width and depth of the channels for forward and backward movement, by a different length of screw and by making other alterations in order to obtain, according to needs, coarser mixtures involving lesser load and giving higher output, or else increasingly fine mixtures with greater load.

Figure 3:
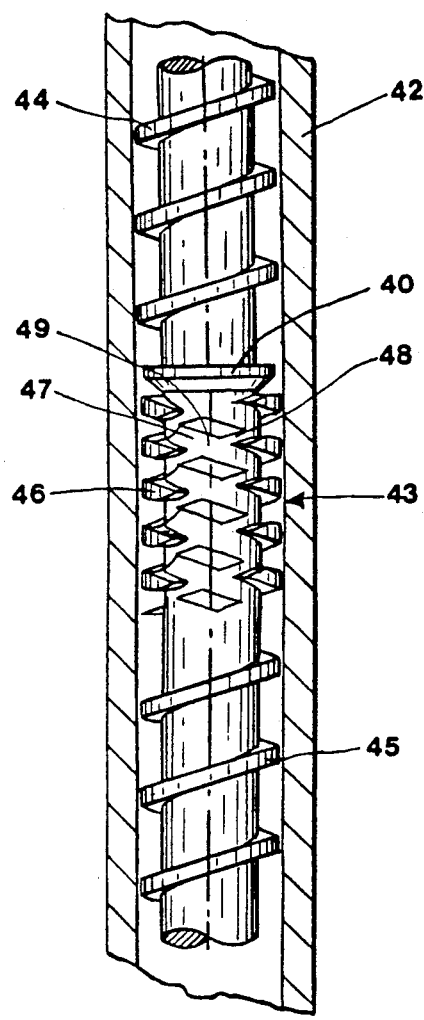
FIG. 3 is a side view, partly in section, of a screw extruder with a throttle bushing downstream of the mixer device of the invention.

FIG. 3 shows a throttling bushing 40 mounted on the screw 41 of the extruder inside the cylinder 42 downstream of mixer 43. The mixer comprises a threading 46 having several back threads cut in a direction contrary to that of threadings 44 and 45 of the extruder screw, the back threading producing a backward flow of material which, on meeting the forward moving flow of material gives rise to mixing. To assist forward movement of the mixed material a helical channel 48 is cut in the back threading 46, in a direction contrary to that of the screw, the direction of the helical channel being contrary to that of said threading 46 and therefore the same as that of the extruder screw.

Between channel 47 of the contrarywise threading and the helical channel 48, various crossing points 49 occur where mixing of the material arriving from the channels as well as from the preceding crossing points 50, takes place. Consequently, the mixing process is being gradually improved while the mixer material moves forward.

The bush 40 slows down flow speed of the mixed material making mixing even more thorough.

Figure 4:
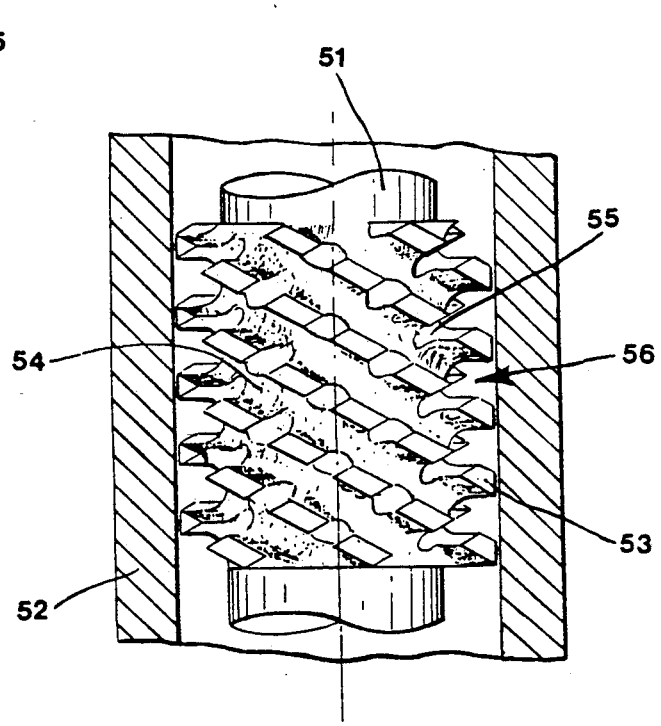
FIG. 4 is a detail of a mixer similar to that in FIG. 3.

The detail in FIG. 4 illustrates a mixer 56 similar to mixer 43 in FIG. 3, cut in the screw 51 rotating inside the cylinder 52, showing the threading 53 cut in a direction contrary to that of the feed threading of the screw.

The helical channel 54 created by the threading 53, is intersected by helical channel 55 in the opposite direction, to allow passage of the mixed material thrust forward by the feed threading of the screw.

Figure 5:
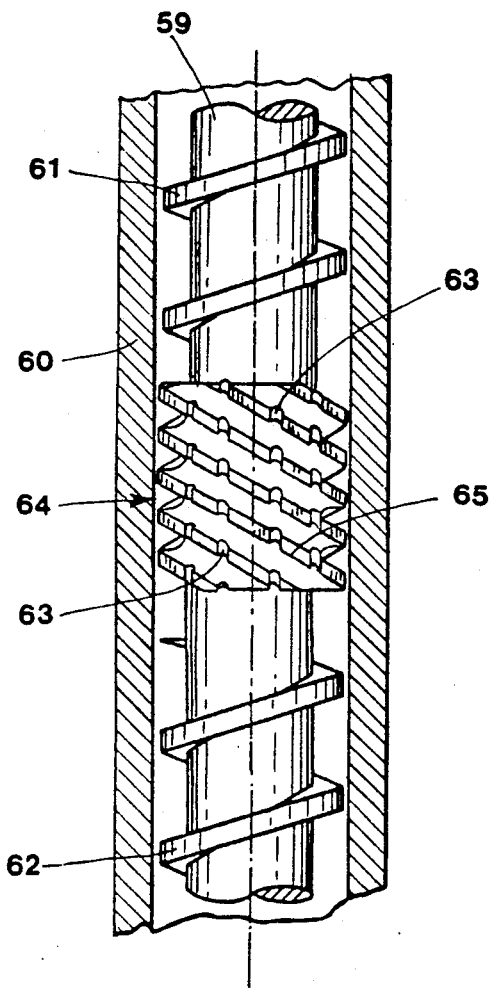
FIG. 5 shows an extruder screw with a mixer formed by threads cut in a direction contrary to those of the screw, and channels along which the material passes, aligned to the axis of the screw.

FIG. 5 shows a length of a screw 59 of an extruder, turning inside a cylinder 60 with mixer 64 comprising threading 65 cut in a direction contrary to that of screw threadings 61 and 62.

Forward movement of the mixed material is ensured by channels 63, made in the threading 65, parallel to the axis of the screw.

Figure 6:
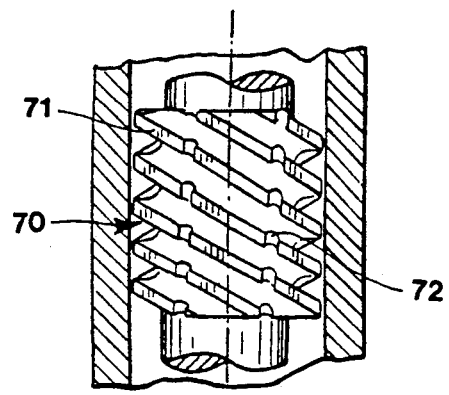
FIG. 6 shows the mixer of FIG. 5 with channels directed at an angle in relation to the axis of the screw.
Figure 7:
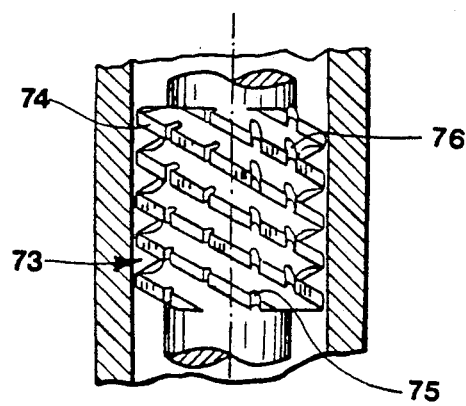
FIG. 7 is a mixer as in FIG. 5 with channels increasing in size.
Figure 8:
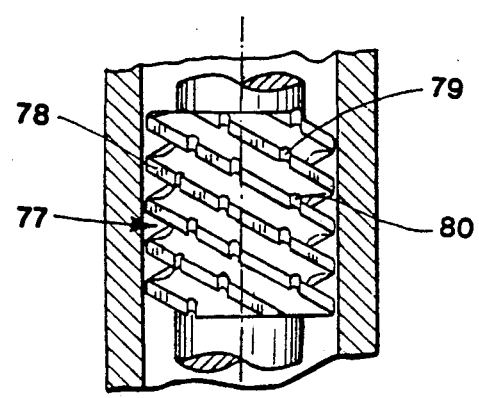
FIG. 8 is a mixer as in FIG. 5 with staggered channels.
Figure 9:
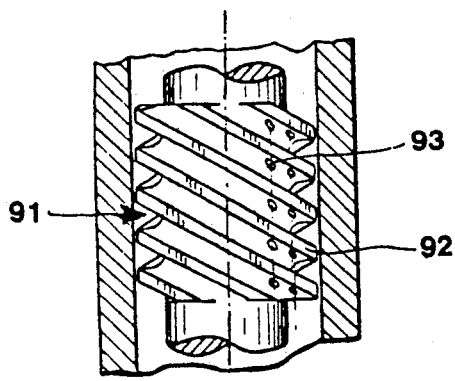
FIG. 9 is a mixer as in FIG. 5 with holes aligned parallel to the axis of the screw to allow passage of the material.
Figure 10:
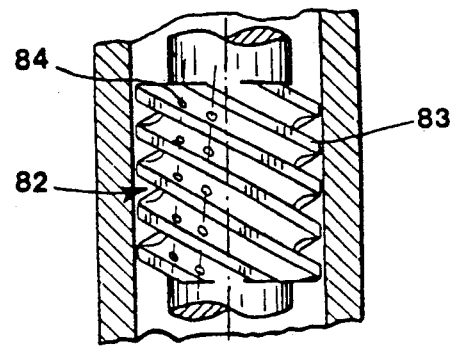
FIG. 10 is a mixer as in FIG. 5 with holes aligned at an angle in relation to the axis of the screw.
Figure 11:
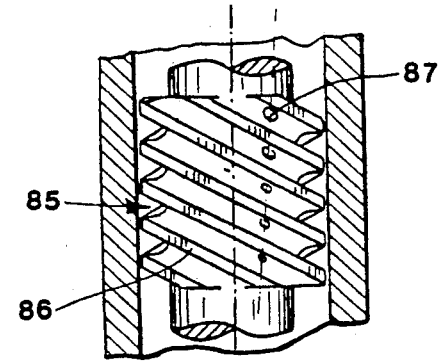
FIG. 11 is a mixer as in FIG. 5 with holes increasing in size.
Figure 13:
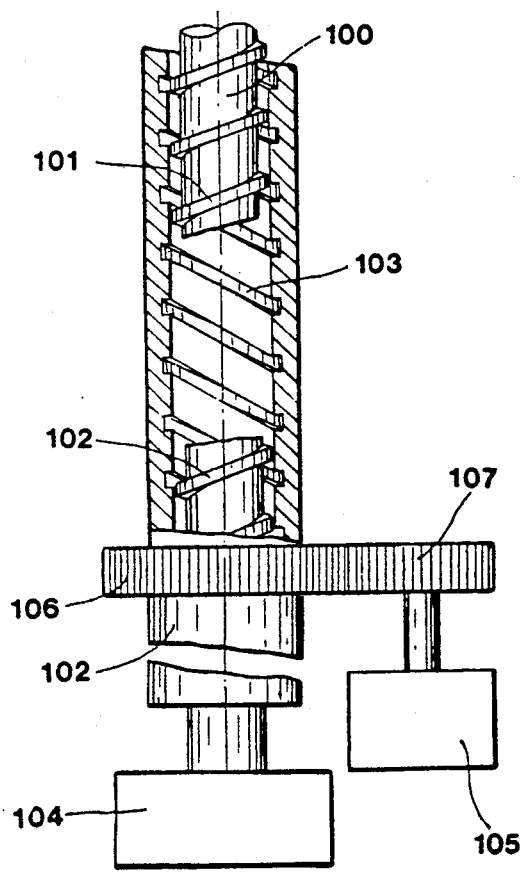
FIG. 13 is a side view, partly in section, of an extruder with backthreading cut in the inner face of the rotating cylinder.
Figure 12:
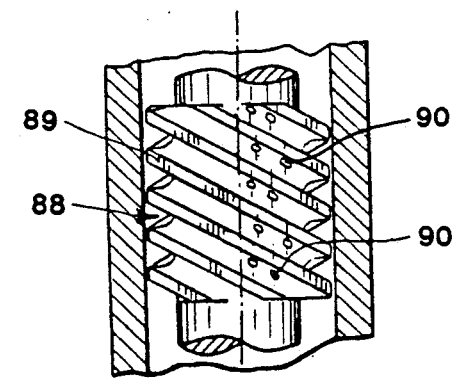
FIG. 12 is a mixer as in FIG. 5 with staggered holes.

FIGS. 6–12 illustrate different forms of the mixer of screw 60 in FIG. 5, the differences consisting in the provision of channels and holes on its threading to pass the material. In particular, FIG. 6 shows a mixer 70 with channels 72 on threading 71, the channels being aligned at an angle in relation to axis 71. FIG. 7 shows a mixer 73 with channels 75, 76 on threading 74, the channels increasing in size; FIG. 8 shows a mixer 77 with staggered channels 79, 80 on threading 78; FIG. 9 illustrates a mixer 91 with holes 93 on threading 92, holes being aligned parallel to the axis of said threading; FIG. 10 shows a mixer 82 with holes 84 on threading 83 aligned at an angle in relation to the axis of the thread; FIG. 11 shows a mixer 85 with holes 87 on threading 86, which holes increase in size; FIG. 12 illustrates a mixer 88 with staggered holes 90 on threading 89; and FIG. 13 illustrates a variation comprising the screw 100, with threading 101 for forward movement of the material, rotating inside cylinder 102 in whose inner walls threading 103 has been cut in a contrary direction.

The screw 100 rotates when driven by the motor 104 while cylinder 102 rotates driven by motor 105 by means of the cog wheel 106 fixed to the cylinder and the cog wheel 107 fixed to the motor shaft.

The process of the invention can be actuated with two or more screws rotating in the same or in opposite directions, some with right hand threading and others with left hand, or vice versa, or else each one having lengths of right or left hand threading to create the forward and backward movements needed for mixing.

By means of the process of the invention, the friction created by passage of material in the various channels enables, in the case of thermoplastics, the achievement of temperatures required for fusion and homogenization.

In some cases the mixer can operate continuously without the need for electric heating elements due to the large amount of mechanical energy that becomes transformed into heat. To prevent the material returning backwards from hindering the forward movement of material pressed on by the screw, the screw can be given a greater length than the mixer downstream and in this way the power of the forward thrust will be increased.

I claim:

1. An extruder for homogenizing, kneading, dispersing, coloring and mixing a material, comprising a cylinder; and an extruding screw arranged for rotation within said cylinder, said extruding screw having one end threading extending in one direction, another end threading extending also in said one direction, and two mixing threadings located between said one and other end threadings and including a forward threading extending in said one direction, and a counterthreading extending in the opposite direction and intersecting said forward threading, said forward threading and said counterthreading having the same pitch to delimit two helical channels that cross each other at a plurality of free intersections, one of said channels imparting a forward movement to the material while the other channel imparting a return movement to a part of said material to create a backward flow of material which, on meeting the forward flow causes the material from the two crossing helical channels to mix whereby the mixing becomes increasingly thorough as the forward flow of material proceeds, said one threading, said two mixing threadings, and said other end threading having the same diameter.

2. An extruder as defined in claim 1, wherein said extruding screw has a shaft on which said threads are arranged, said shaft having an identical diameter over its whole length.

3. An extruder as defined in claim 1, wherein at least one of said threadings has a crest provided with channels, holes, or the like cutouts for assisting the forward movement of the material.

4. An extruder as defined in claim 1, wherein said cylinder has an inner surface provided with channels, holes or the like cutouts for assisting forward movement of the material.

* * * * *